May 12, 1959  R. A. ROBERT ET AL  2,886,261
REMOTE CONTROL AIRCRAFT SYSTEM
Filed May 25, 1954
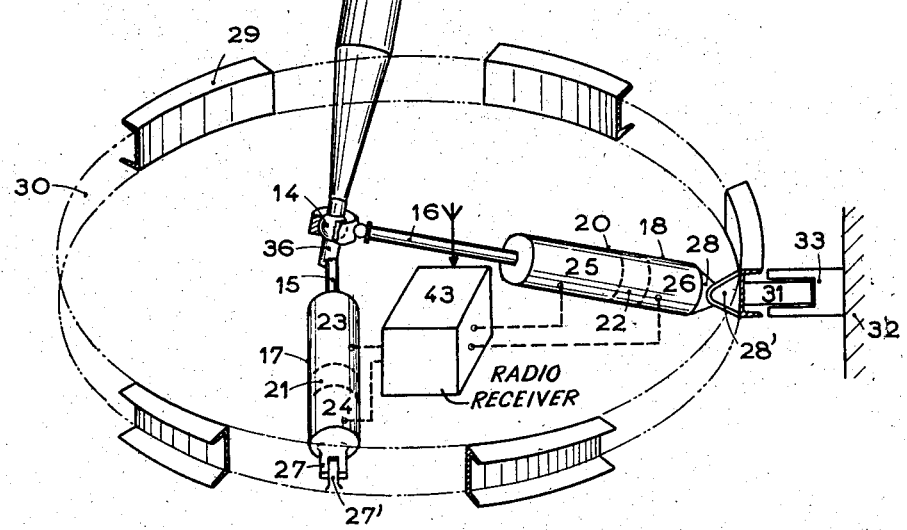

2,886,261
REMOTE CONTROL AIRCRAFT SYSTEM

Roger Aimé Robert, Boulogne-sur-Seine, and André Marcel Emile Henault, St. Cloude, France; said Henault assignor to said Robert Application May 25, 1954, Serial No. 432,169

6 Claims. (Cl. 244—17.25)

This is a continuation-in-part of our Patent No. 2,684,213.

This invention relates to craft guidance means, and more particularly to apparatus for guiding a rotary-wing aircraft towards a predetermined landing point.

It is one object of the invention to provide apparatus whereby an observer stationed on the ground at or near a desired landing location will be able to guide the autorotational descent of a rotary-wing aircraft accurately towards said location, even in the absence of any human pilot aboard the craft.

According to the invention, a reference direction passing through the desired landing point or a point adjacent thereto is established aboard the aircraft to serve as a reference for the actuation of automatic means on the craft operative to modify the path followed thereby during landing.

The said reference direction characteristically associated with the landing point may be magnetic North or geographic North or any other suitable direction. The reference direction is reproduced on board the craft through radio transmission.

The invention is desirably applied to an aircraft the rotary-wing structure of which is carried on a hub universally mounted on the craft structure through a swivel joint or the like whereby the tilt of the rotary wing axis relative to vertical may be varied in any desired direction within the limits of a solid cone in order to direct the landing path of the craft.

In one embodiment of the invention as applied to a craft of the type just specified, the said hub is angularly positioned by the combined action of a pair of actuators—e.g. hydraulic motors or jacks—arranged out of alignment with each other, and preferably at right angles with each other, carried on a rotary support or platform perpendicular in extent to the normally upstanding axis of the rotary-wing structure, means being provided for rotating said support from the ground whereby a given direction of said platform may be set parallel to the reference direction.

An embodiment of the invention will now be described by way of illustration with reference to the accompanying diagrammatic drawings wherein:

Fig. 1 is a perspective view showing part of the rotary-wing structure and the actuating means therefor according to the invention;

Fig. 2 is a block diagram further illustrating a fragment of the structure of Fig. 1, in axial section on an enlarged scale;

Fig. 3 is a block diagram of the ground control station.

As shown in Fig. 1, a rotary-wing structure comprises a hub 10 and wing blades 11 carried thereon, the hub 10 being provided with a spherical swivel portion 12 adapted to cooperate with a complementary spherical socket 13 forming part of the fixed frame of the aircraft.

Coupled to the lower end of the hub 10 through a ball 14 are the displaceable elements 15 and 16 of a pair of actuators or jacks 17 and 18 comprising cylinders 19 and 20. The displaceable elements 15 and 16 may constitute piston rods attached to pistons 21 and 22 slidable in the cylinders and defining therein the chambers 23—24 and 25—26 respectively. The actuator cylinders 17 and 18 have clevises 27 and 28 formed on the outer ends thereof by means of which the cylinders are pivoted to lugs 27′ and 28′ projecting from the flange 29 of a rotatable platform 30 comprising an annular peripheral channel element providing a runway cooperating with a plurality of horizontal rollers 31 rotating on brackets 33 secured to the frame 32 of the aircraft.

The platform 30 (Fig. 2) is provided with a central boss or hub 34 in which a recess 35 is formed adapted to cooperate with an appendage 36 forming the lower end of the hub 10 for centering the latter when the craft is not in condition for an automatic landing according to the invention. Formed around the periphery of boss 34 is a gear 36 adapted to mesh with a pinion 37 secured on the output shaft 38 of a suitable electric motor 39. The motor 39 is energized for selective rotation in opposite directions through leads 41 and 42 from the output of a suitable radio receiver 40 of conventional design herein illustrated in block form. The actuators 17 and 18 are controlled through a radio receiver 43 mounted on the platform 30 and adapted in response to control signals received thereby to operate either or both of the actuators selectively so as to cause the displaceable members to be moved into or out of the related cylinders. Both the receiver 40 and the receiver 43 are adapted to receive control signals from a remote station P at or near the predetermined landing location. The control station P comprises means for establishing a directional reference, for example a magnetic compass 44 or equivalent means, and a radio transmitter 45 having an aerial 46 for transmitting radio signals capable of being received by the receiver 40 and converted thereby into suitable control signals fed to the reversible motor 39 to rotate the latter in either direction depending on the polarity of phase condition of the control signals. Rotation of the motor 39 rotates the platform 30 in a corresponding direction until a predetermined direction or radius of the platform has been brought into alignment with reference direction as indicated for example by the index 47 of the compass. Any suitable servo-system may be used for operating the motor 39 in the manner just described. Also provided at the control station P is a further radio transmitter 48 provided with two suitable adjusting knobs or the like 49 and 50 whereby radio signals may be transmitted to the receiver 43 for operating the actuators 17 and 18. For example, the adjusting knob 49 may serve to control the position of the actuator 17, the displaceable element of this actuator being moved inwards or outwards according as the knob 49 is moved to one or the other side of a neutral position. Similarly the knob 50 will serve to control the position of the actuator 18.

The arrangement described operates as follows: When the ground operator located at the station P catches sight of the aircraft which previously was controlled in some other suitable manner, and as the craft commences its autorotational descent, the path of the craft is guided towards the predetermined landing point in the following way: The switch 51 of transmitter 45 is placed in operative position. Transmitter 45 constitutes the transmitter unit of a radio remote control system whereof the receiver unit is provided by the receiver 40. As disclosed above the system operates to bring a predetermined radial direction of platform 30 into, and maintain it in, alignment with the reference direction established by the directional instrument 44. This establishes a directional reference on board the craft, said reference remaining fixed regardless of the craft's position and attitude, and the operator then adjust the knobs 49 and 50 to guide the descent of the craft as easily and accurately as if he were on board. That is, by observing the position of the craft the operator is able at any instant to correct any displacement the craft may tend to assume off the ideal landing path towards the preselected point, and thus bring in the craft safely and surely to a landing at said point.

What we claim is:

1. A guidance system for a rotary-wing aircraft for guiding the craft in descent toward a preselected landing area, which comprises means for reproducing on said aircraft a predetermined reference direction at said area, and means for controlling the tilt of the axis of rotation of the rotary wing structure of said aircraft with reference to said fixed direction as reproduced on said craft.

2. A system for guiding a rotary-wing aircraft in descent towards a preselected landing area, comprising, a remote control transmitter station, signal transmitting means at said station for transmitting signals indicative of a predetermined topographical direction at said landing area, means on said craft for receiving said signals and for maintaining at all times a selected direction of the craft in a constant predetermined angular relationship with the said topographical direction, means on the craft for controlling the tilt of the axis of rotation of the rotary wing structure thereof, and further transmitter means on said landing area for remotely controlling said tilt control means.

3. A system for guiding a rotary-wing aircraft from a preselected landing area, which comprises, a rotary-wing structure on said craft having a hub, means mounting said hub for universal rotation on the craft, a support mounted for rotation about a predetermined axis of said craft, a first actuator mounted on said support and operatively connected with said hub, a second actuator mounted on said support at an angle to said first actuator means and operatively connected with said hub, first radio receiver means for actuating each of said actuator means in either one of two opposite directions, second radio receiver means and means responsive thereto for adjusting said support angularly about said predetermined axis, transmitter means at said area constituting the transmitter of a remote control system cooperating with said second receiver for reproducing a topographical direction of said area as a related angular position of said support, and further transmitter means at said area adapted for cooperation with said first receiver to actuate said actuator means.

4. In a rotary wing aircraft having a shaft for the rotary wing, means mounting the shaft for universal rotation and jack means for controlling the relative vertical tilt of the shaft: a support for the jack means mounted for rotation around the shaft axis with said axis vertical, and means for controlling the rotation of the support from a control station outside the aircraft.

5. In a rotary wing aircraft comprising a wing shaft mounted for universal rotation and two jacks arranged at an angle to each other and operatively connected to the shaft to vary the angle thereof with respect to a mean position: a platform perpendicular to the shaft in said mean position and mounted for rotation on the aircraft about said shaft, drive means for rotating the platform in either direction, means for controlling the drive means from a control station outside the aircraft, and remote control means for actuating either jack for extension or retraction.

6. A remote-control system for landing a rotary wing aircraft having a universally rotatable wing shaft and comprising two angularly disposed jacks each having one end operatively connected to the shaft to vary the inclination thereof with respect to a mean vertical position, said system comprising: a platform occupying a position transverse to said shaft in the mean vertical position thereof and mounted on the aircraft for rotation about the axis of said shaft, the two jacks having their other ends supported by said platform, drive means for rotating the platform, radio control means for the drive means comprising a first receiver on the aircraft and a first transmitter at the landing site, actuating means for extending and retracting each of the jacks selectively, and radio-control means for the actuating means comprising a second receiver on the aircraft and a second transmitter at the landing site, said second transmitter comprising two actuating members corresponding respectively to the two jacks for extension or retraction thereof in accordance with actuating movements imparted to the respective member in either direction relatively to a mean position corresponding to the said mean vertical position of the wing shaft.

References Cited in the file of this patent

UNITED STATES PATENTS

| | | |
|---|---|---|
| 1,788,218 | Wettstein | Jan. 6, 1931 |
| 2,165,800 | Koch | July 11, 1939 |
| 2,393,892 | Ganahl | Jan. 29, 1946 |
| 2,398,419 | Finison | Apr. 16, 1946 |
| 2,733,878 | Ciscel | Feb. 7, 1956 |
| 2,769,601 | Hagopian et al. | Nov. 6, 1956 |